United States Patent

[11] 3,633,850

| [72] | Inventor | Lewis Feldman<br>15 Ireland Place, Amityville, N.Y. 11701 |
|---|---|---|
| [21] | Appl. No. | 789,328 |
| [22] | Filed | Jan. 6, 1969 |
| [45] | Patented | Jan. 11, 1972 |

[54] FLEXIBLE SAIL ROTOR DEVICES
33 Claims, 24 Drawing Figs.

[52] U.S. Cl. .................................................. 244/17.11,
244/1 SS, 416/142, 416/143, 416/21
[51] Int. Cl. ...................................................... B64c 27/00
[50] Field of Search ............................................ 416/142,
143, 20, 21, 87, 88, 89; 244/1, 2, 17.11, 17.13,
17.27, 63, 138, 4, 1 SS

[56] References Cited
UNITED STATES PATENTS

| 1,897,092 | 2/1933 | Weir .................................... | 416/21 |
| 2,172,333 | 9/1939 | Theodorsen et al. ......... | 416/88 |
| 2,329,414 | 9/1943 | Nelson ......................... | 244/1 X |
| 2,763,447 | 9/1956 | Carrau ......................... | 416/21 X |
| 3,101,121 | 8/1963 | MacNeal ...................... | 416/88 |
| 3,116,040 | 12/1963 | Petrides et al. ............... | 244/17.13 |
| 3,117,630 | 1/1964 | Barish ......................... | 244/17.11 X |
| 3,175,619 | 3/1965 | Reed, Jr. ...................... | 416/142 X |
| 3,184,187 | 5/1965 | Isaac ............................ | 244/17.11 X |
| 3,246,864 | 4/1966 | Mack et al. ................... | 416/143 X |
| 3,333,643 | 8/1967 | Girard ......................... | 416/142 |
| 2,640,549 | 6/1953 | Isacco ......................... | 416/63 X |
| 2,750,131 | 6/1956 | Thomson...................... | 244/17.19 |

FOREIGN PATENTS

| 1,239,297 | 7/1960 | France ........................ | 416/20 |

*Primary Examiner*—Trygve M. Blix
*Assistant Examiner*—Paul E. Sauberer
*Attorney*—Larson, Taylor and Hinds

ABSTRACT: A launched, self-sustaining station-keeping vehicle is maintained in flight by flexible rotor blades deployed and tensioned by the centrifugal forces acting on a mass (which takes the form of a rocket or the like) located at the tip of each rotor, the rockets sustaining rotation of the rotor blades. The blades are wrapped around a normally rotatable spool portion of the vehicle during launch. A spin is imparted to the vehicle during flight which aids in deploying the blades when the tip rockets are released. A vehicle-mounted control system controls stabilization and station keeping through control of the blade angle setting of the rotor blades. Improvements of general application include improving the aerodynamic shape of such blades by securing appropriately shaped fairings thereto.

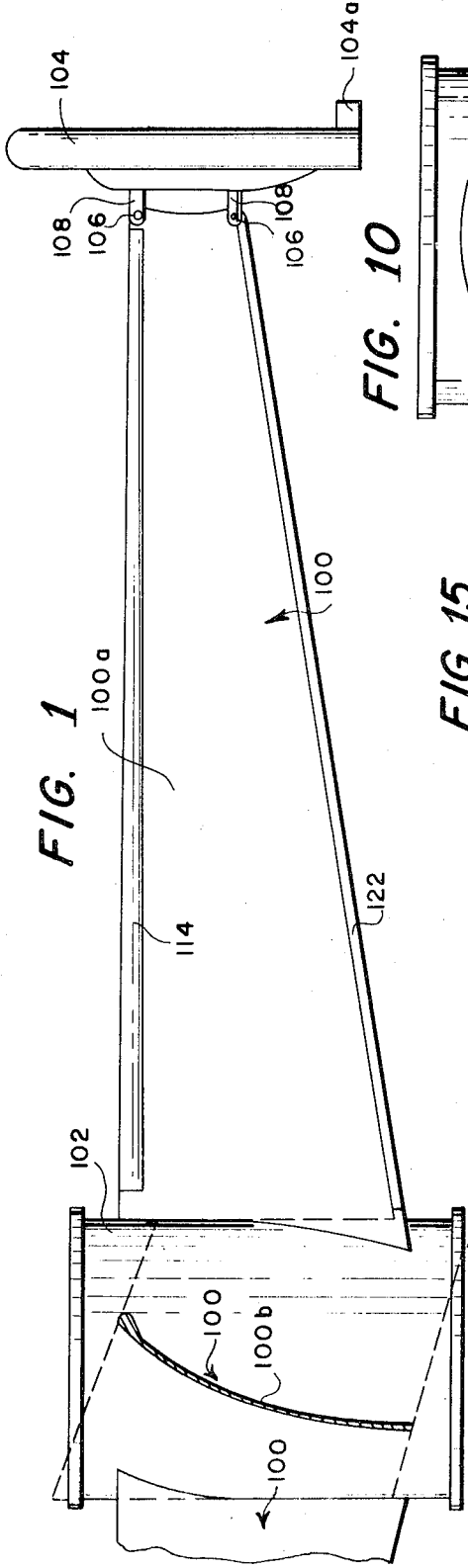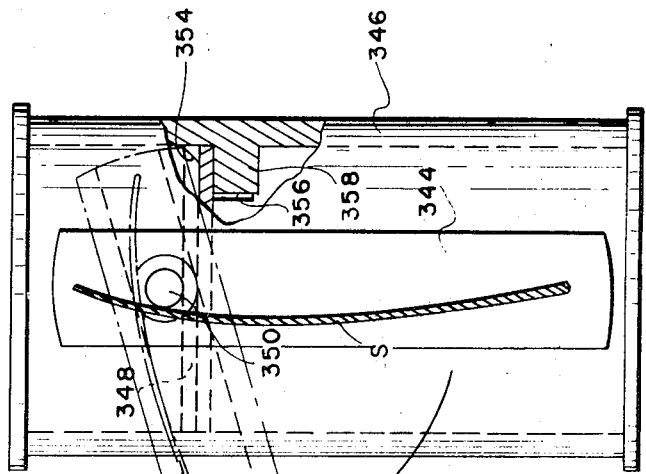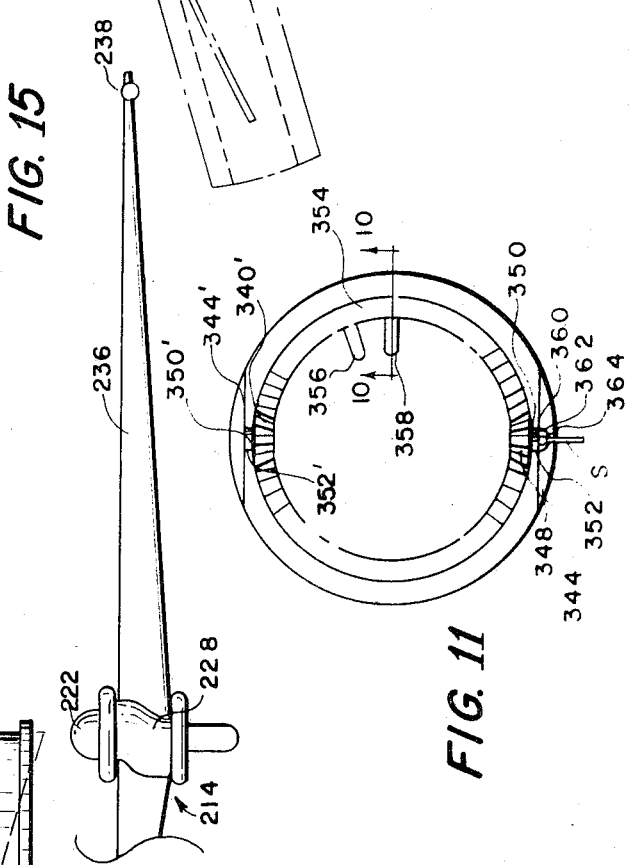

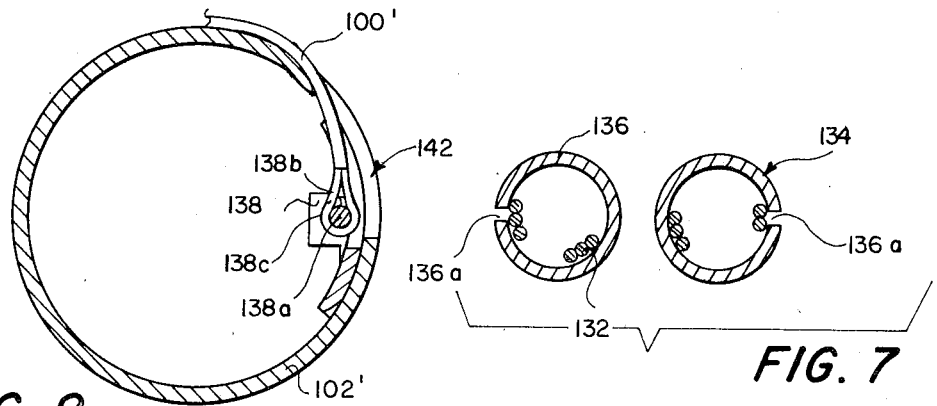
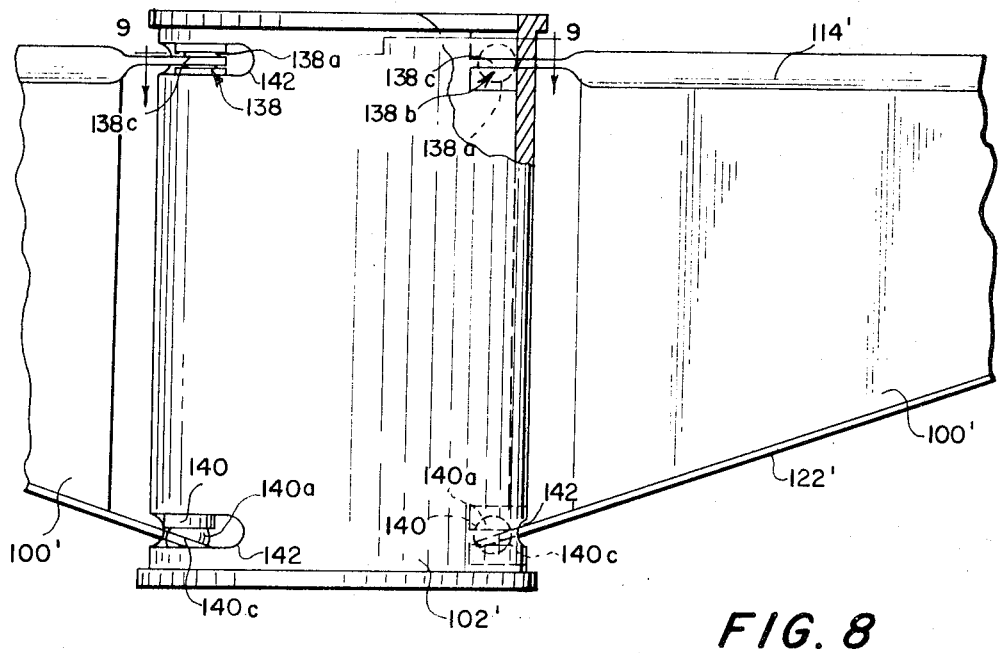
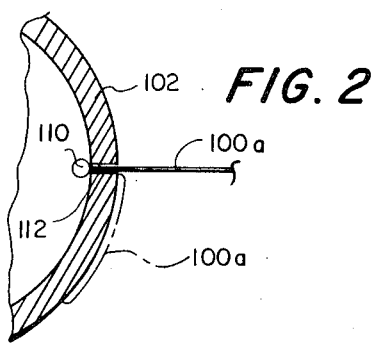

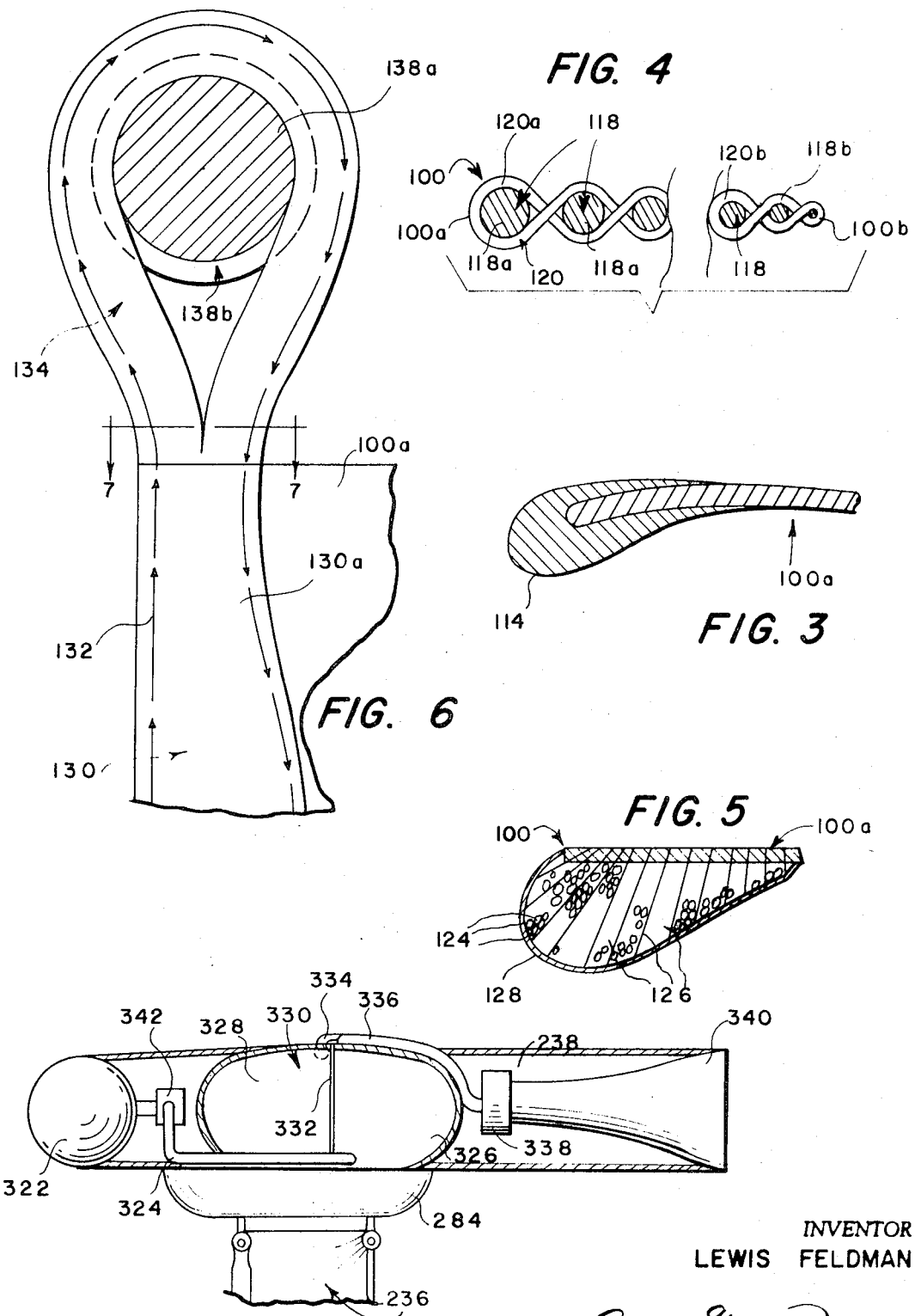

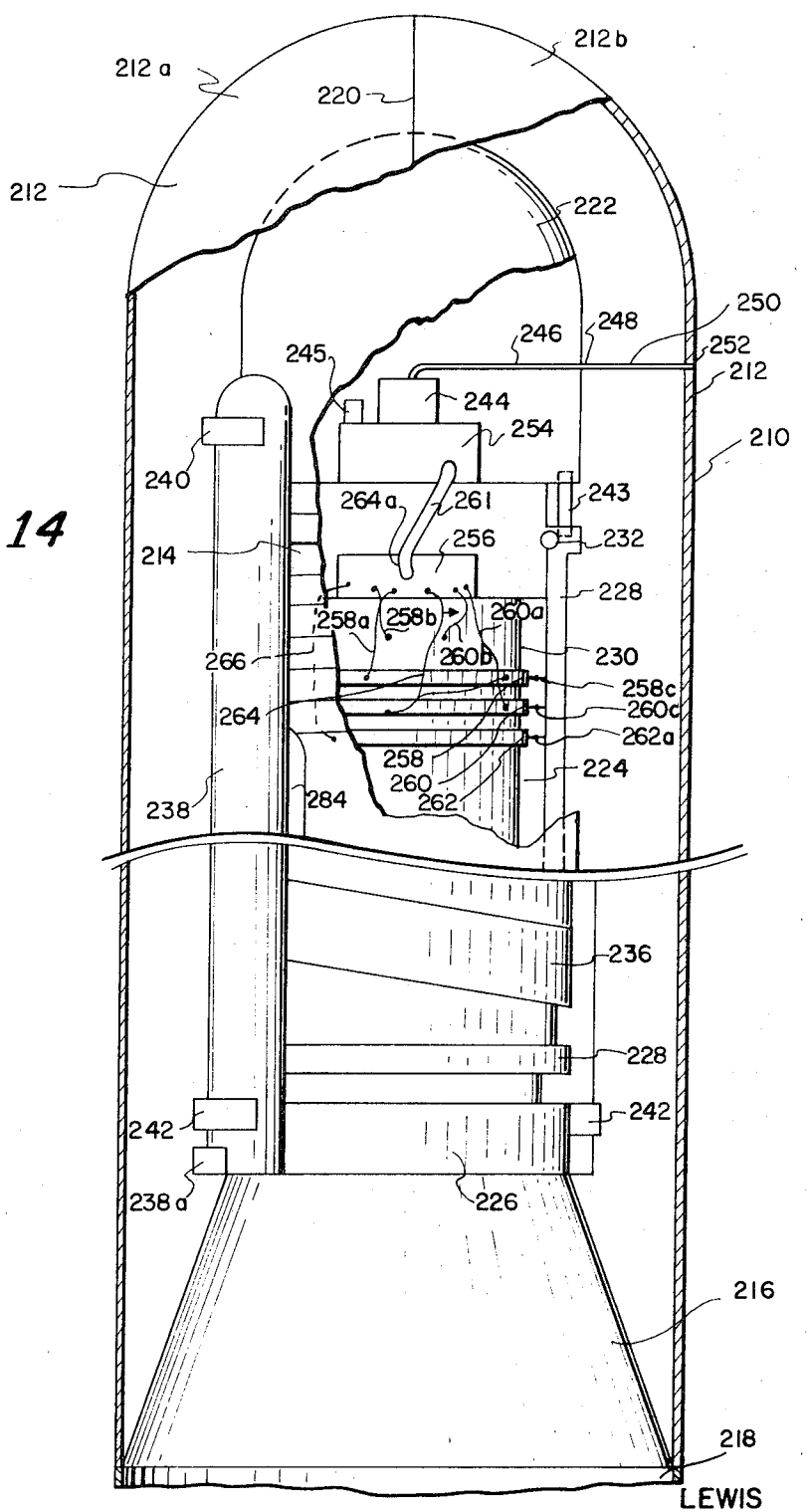
FIG. 14
FIG. 17
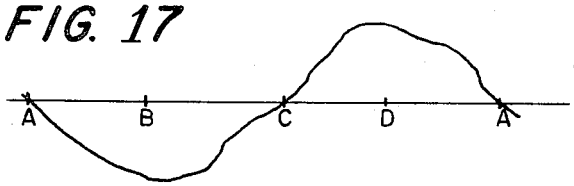
INVENTOR
LEWIS FELDMAN
BY Larson and Taylor
ATTORNEYS

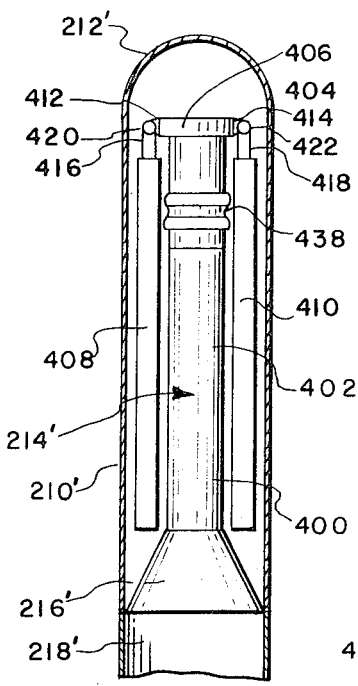
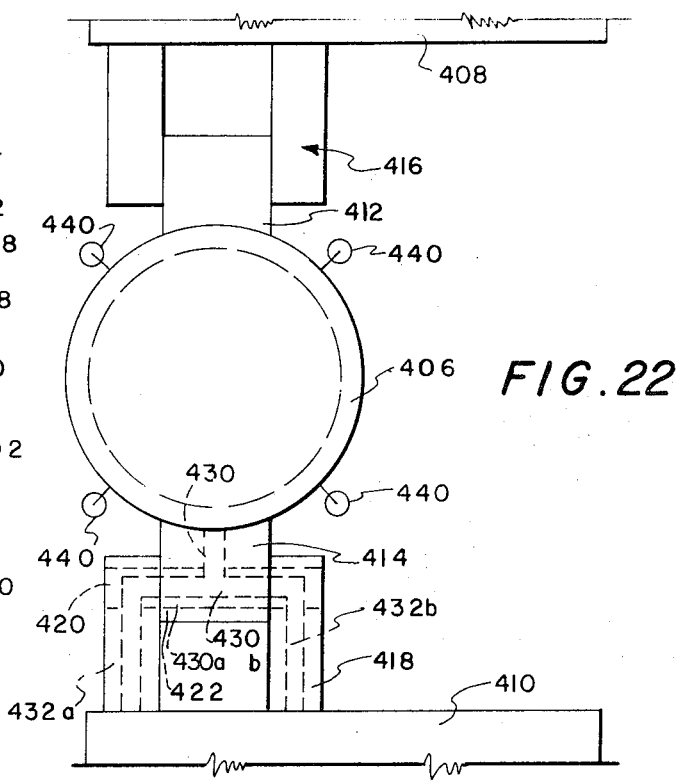
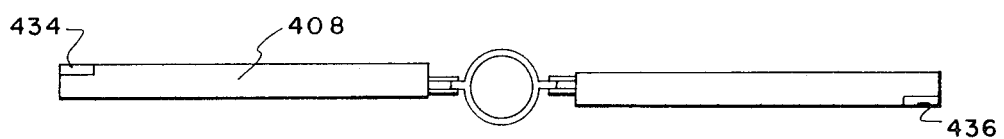
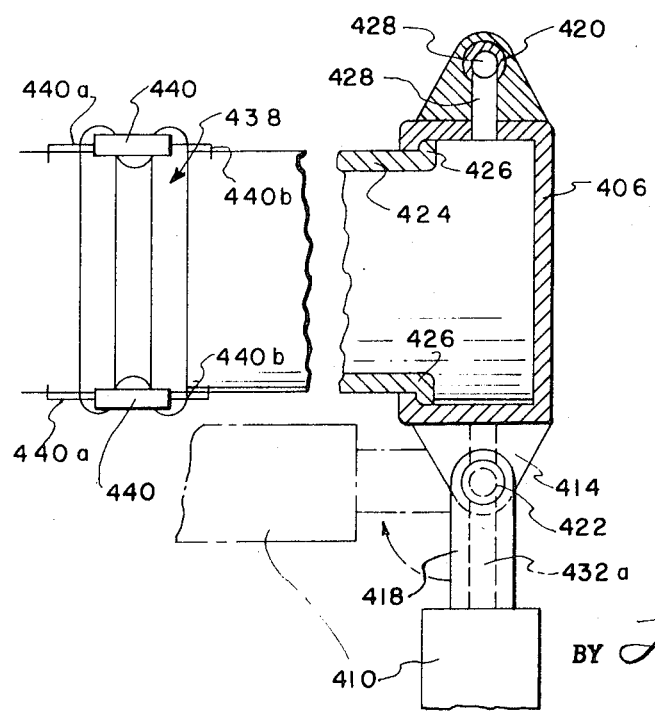

FLEXIBLE SAIL ROTOR DEVICES

FIELD OF THE INVENTION

The present invention generally relates to rotary wing air vehicles of the type wherein a flexible rotor blade is deployed by the centrifugal force on a mass located at the tip of the blade and to rotor blade assemblies usable in such air vehicles as well as in fans, windmills and the like. The invention further relates to a particular improved air vehicle.

BACKGROUND OF THE INVENTION

The use of flexible blade or wing rotary assemblies affords a number of advantages as compared with arrangements employing rigid blade assemblies. One important use for such flexible rotor assemblies is in aircraft such as helicopters and autogiros as well as in more unusual applications such as recovery devices for vehicles reentering from space. However, prior to the present invention, full advantage has not been taken of the possibilities provided by flexible rotor blade assemblies. Because the present invention relates both to features of general utilization as well as to a particular improved air vehicle it is felt that the advantages provided by the present invention can be best appreciated from a consideration of the discussion of the invention itself found hereinafter.

SUMMARY OF THE INVENTION

In accordance with one important aspect of the invention an improved flexible rotor aeronautical vehicle is provided which functions as a self-sustaining station, which is referred to hereinafter for purposes of convenience as a "sky-hook." The vehicle of the invention generally comprises a body portion which carries the vehicle payload and a rotary or spool portion adapted to rotate with respect to the body portion. Flexible rotor blades are fixed at the inboard ends thereof to the spool portion and may be wound around this spool portion to effect stowage thereof. The centrifugal forces acting on a mass located at the tip of each of the rotor blades serve in unfurling the flexible rotor blades upon release of the masses. When the masses are released the rotor blades will be fully extended and tensioned thereby so as to function in a manner similar to a rigid wing or blade vehicle. Rotation of the tensioned blades serves to maintain the sky-hook vehicle aloft.

Each tip mass preferably comprises a rocket device or the like for sustaining rotation of the rotor blades, the choice of tip drive being, of course, a function of the duration of the period which the vehicle is to remain aloft.

In accordance with a presently preferred embodiment of the invention the vehicle is launched by suitable means such as a booster rocket which may be jettisoned in a conventional manner when the vehicle reaches the desired altitude, the spin imparted by the rocket being utilized in deploying the rotor blades. In perhaps the simplest version of the vehicle, mounting the blades near the body center of gravity will provide the vehicle with adequate inherent stability for most uses. However, such a vehicle will drift with the wind. When better position stability is required, a vehicle mounted control system is resorted to. The vehicle-mounted control system serves in positioning the vehicle through controlling the blade setting of the rotor blades themselves. Although the control system includes a number of important features, because of the relative complexity thereof, the system (and these features) can best be appreciated from a consideration of the detailed description of the preferred embodiments found hereinbelow.

In accordance with a further important aspect of the invention, an improved rotor blade is usable in but not restricted to the sky-hook vehicle of the invention. In accordance with one feature of the invention the overall performance of the flexible rotor blades is improved by improving the aerodynamic characteristics of the blades as compared with prior art flexible rotor blades. In one embodiment, the leading edge of a rotor blade is shaped to prevent flow separation on the upper surface of the airfoil preferably through the moulding of a suitably shaped soft flexible material onto a basic rotor blade construction of sail material or the like. In accordance with another feature of the invention, strengthening of such blades may be effected by weaving strengthening filaments into the rotor blade fabric or by incorporating such filaments in the moulding added thereto.

In accordance with a further embodiment of the invention a rigid blade sky-hook vehicle is provided, the blades being hinged to provide stowage thereof. Power for driving the blades is provided from a gas generator which supplies compressed gas to thrust nozzles located at the blade tips.

As stated hereinabove, a number of further features of the invention and particularly features relating to the sky-hook vehicle itself, may best be appreciated from a consideration of the detailed description of the preferred embodiments found hereinbelow. Thus a number of further features and advantages of the invention not described here will be described in or apparent from that description.

BRIEF DESCRIPTION OF THE DRAWINGS

FIG. 1 is a side elevational view of a rotor blade construction in accordance with a presently preferred embodiment of the invention;

FIG. 2 is a fragmentary top elevational view of the embodiment of FIG. 1;

FIG. 3 is a sectional view of a first preferred blade construction;

FIG. 4 is a sectional view, similar to FIG. 3, of a second preferred blade construction;

FIG. 5 is a sectional view, similar to FIG. 3, of a third preferred blade construction;

FIG. 6 is a bottom elevational view of the embodiment of FIG. 5 illustrating a preferred manner of attachment of a rotor blade to a tip or root support element;

FIG. 7 is a sectional view taken generally along line 7—7 of FIG. 6;

FIG. 8 is a side elevational view, partially broken away, of an embodiment of the invention which incorporates the embodiments of FIGS. 6 and 7;

FIG. 9 is a sectional view taken generally along line 9—9 of FIG. 8, showing a rotor blade in the stowed position thereof, portions being removed for purposes of clarity;

FIGS. 10 and 11 are side and top elevational views respectively of a modification of the root boom assembly of the embodiment of FIG. 1, FIG. 10 being partially broken away for illustrative purposes in an area indicated by line 10—10 in FIG. 11;

FIG. 14 is a side elevational view, partially in section and partially broken away, of a presently preferred embodiment of the station-keeping vehicle of the invention;

FIG. 15 is a fragmentary side elevational view, to a reduced scale, of the embodiment of FIG. 14 wherein the rotor blades are shown in the unfurled positions thereof;

FIG. 17 is a diagram used in explaining the operation of a portion of the control system of the embodiment of FIG. 14;

FIG. 18 is a detail view, partially in section, of a presently preferred embodiment of a control mechanism for controlling the blade angle setting of the rotor blades of the embodiment of FIG. 14;

FIG. 19 is a sectional view taken generally along line 19—19 of FIG. 18 with certain of the elements shown in FIG. 18 removed for purposes of clarity;

FIG. 20 is a sectional view of the tip rockets utilized in the embodiment of FIG. 14;

FIG. 21 is a view similar to FIG. 14 of a rigid blade embodiment of the invention;

FIG. 22 is a fragmentary top elevational view to enlarged scale of the embodiment of FIG. 21;

FIG. 23 is a fragmentary side elevational view to an enlarged scale of the embodiment of FIG. 21 wherein portions are broken away for illustrative purposes; and FIG. 24 is a top elevational view of the embodiment of FIG. 21 with the blades shown in the operative positions thereof.

DESCRIPTION OF THE PREFERRED EMBODIMENTS

Figure 16:
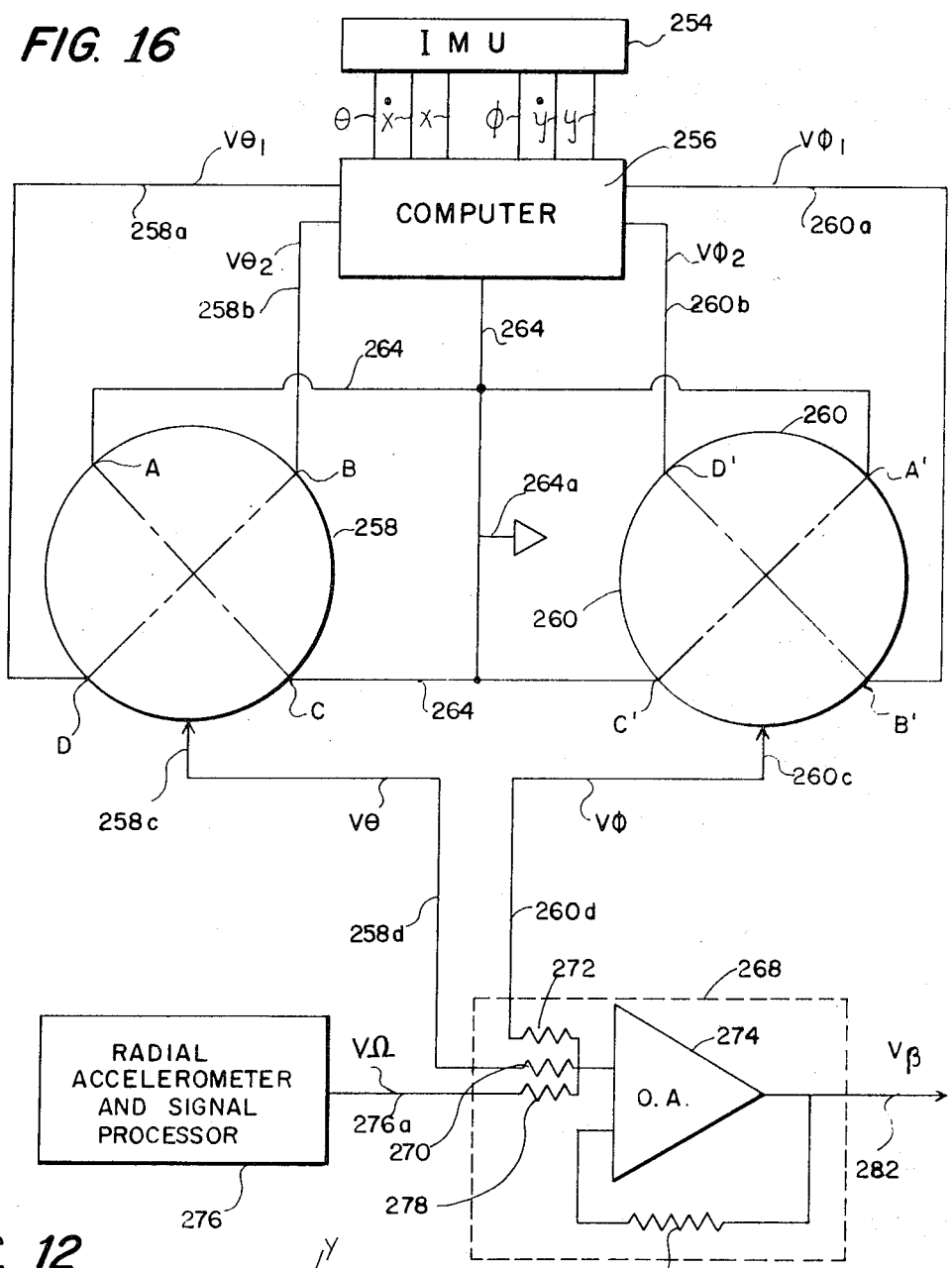
FIG. 16 is a schematic diagram of a portion of the control system for the embodiment of FIG. 14.

To provide a better understanding of the embodiments of the invention some background considerations will first be investigated. It is well known in the corresponding art that for some uses, especially in helicopters and autogiros, the power required to support a given weight with a rotor of given design is inversely proportional to the radius of the rotor blade. On the other hand, the tip speed required to produce the necessary thrust is inversely proportional to the radius of the rotor blade. Moreover, the strength of the blade structure required to hold the centrifugal tension of the tip weight decreases rapidly as tip speed is decreased. Because of this combination of factors the most efficient hovering machine will employ rotor blades of large radius and operate these blades at low tip speeds such that relatively little tensile strength is required. In the device of the present invention the tensile strength of the sail fabric which is preferably used to construct the rotor blades will serve to carry all of the required loads. These blades will be referred to, because of the sail fabric construction thereof, for convenience as "sail rotor blades."

Referring to FIG. 1, there is shown an embodiment of the sail rotor assembly of the present invention wherein a series of said rotor blades generally denoted 100 are attached to a rotary hub 102. The construction of the blades 100 are substantially identical and thus the construction of only a single blade 100a is fully illustrated and will be considered in detail hereinbelow. A tip weight 104 is attached to blade 100a by first and second pins 106 which extend through first and second fork members 108 and through grommets (not shown) located in the outboard corners of blade 100a. Rotor blade 100a is shown in a developed view it being understood that in operation tip weight 104 will fly in a plane generally perpendicular to the longitudinal axis of hub 102 as is indicated in FIG. 15. The leading edge of blade 100a is preferably of the straight-line form shown in FIG. 1 whereas the trailing edge may, for example, be of the sloping straight-line form shown in FIG. 1. The trailing edge may also be concave, convex or of a straight-line form similar to the leading edge as design considerations warrant.

The sail 100a includes a flexible member 110 secured thereto along the inboard chord thereof. Member 110, which preferably comprises a rope sewn along the edge of blade 100a, is located within the interior of hub 102 as shown in FIG. 2. The inboard end of blade 100a extends through a narrow slot 112 in hub 102 which is of a thickness less than the diameter of rope 110 and which thus cooperates with rope 110 in retaining the inboard end of blade 100a within hub 102.

As shown in FIG. 1, for reasons to be discussed more fully hereinbelow, slot 112 is nonvertical, that is, stated more generally, slot 112 extends at an angle to the longitudinal axis of hub 102 rather than parallel thereto. It will be appreciated that where it is desired to wrap the blades around hub 102 to provide stowage thereof the nonvertical location of the slot will create problems in that the blades will tend to wrap around hub 102 in a manner such that kinking thereof may occur. To explain, in wrapping a blade around the hub 102, the longitudinal axis of the blade will extend along a line perpendicular to the chord of the blade, which chord is skewed with reference to the longitudinal axis of the hub 102. Thus the blade 100b will tend to wrap around hub 102 in the manner indicated in dashed lines in FIG. 1. This problem can be overcome by feeding the leading edge of each of the blades 100 into the corresponding slot 112 so that the upper end of associated rope member 110 is out of contact with the inner wall of hub 102 and the rope member 110 extends generally parallel to the longitudinal axis of the hub 102. Under these circumstances the blades 100 will tend to wrap naturally around hub 102 in a uniform manner.

To briefly consider the operation of the blade assembly of FIGS. 1 and 2, it is noted that under the action of the centrifugal forces acting at the center of mass of the tip weight 104 tensile forces will be introduced into the sail 100a through the various attaching elements. The blade 100a will be tensioned by these forces and will assume a winglike shape which produces the required aerodynamic forces.

One possible disadvantage of the sail construction described so far is that the leading edge is very thin or, stated differently, the radius of the leading edge is small in comparison with the chord. Airfoil experience teaches that such thin leading edges cause separation on the upper surface of the airfoil except at special angles of attack. Because the sail rotor blade 100a will not operate in a stable manner at these special angles of attack it has been found to be advantageous to provide shaping of the leading edge such as to avoid flow separation. Referring to FIG. 1 and more particularly to FIG. 3, a suitably formed moulding 114 is cemented to the leading edge of the basic sail rotor blade 100a. The moulding 114 is constructed of a relatively soft material such as rubber or plastic so as to permit the blade to be rolled up along the span thereof for stowage as described hereinabove. On the other hand, the moulding material must be firm enough so as to maintain the required shape of the blade in a direction along the chord when the blade is under an airload. The embodiment of FIG. 3 as described is suitable for use under load conditions wherein the sail material alone can be employed.

In the event that a specific design requires a limited blade radius and, consequentially, a tip speed inconsistent with the strength of the sail material alone, stronger materials can be added to the basic blade 100a as needed. Referring to FIG. 4, there is shown one way in which stronger material can be added to the sail blade. In this embodiment stronger warps generally denoted 118 may be incorporated into the basic weave 120 of the blade 100a. The warps 118 may, for example, be formed by glass filaments or steel wires. Because of well known stability requirements, the center mass of the tip weight or mass 104 will lie nearer to the leading edge of blade 100a than to the trailing edge. As a result the material forming the leading edge will carry higher loads than the remainder of the blade and thus the material forming the blade 100a can be selectively distributed along the chord as required. As shown in FIG. 4, for more highly loaded conditions both the gauge of the sail material and of the strengthening warps 118 may be adjusted along the cord of the blade 100a. As shown, the gauge of the material forming the leading edge (this material being denoted 120a) is greater than the gauge of the material forming the trailing edge (denoted 120b) and, further, the gauge of the reinforcing warps of the leading edge 118a is greater than the reinforcing warps 118b of the trailing edge.

As the tip speed and hence the load on the blade assembly increases the aft or trailing regions of the blade may also require strengthening as shown above in FIG. 4. However, thickening the cross section of the blade 100a in this area must be avoided in that while a blunt leading edge is desirable a blunt trailing edge will cause unnecessary drag. (It should be noted that a number of flexible wing or rotor devices of the prior art employ rotor constructions having such disadvantageous trailing edge shapes.) To avoid these untoward effects it is necessary to strengthen the trailing edge. A thin flat pack of material having a high tensile strength denoted 122 in FIG. 1 can be attached, by suitable means such as stitching or cementing, to the rear portion of the rotor blade 100a to provide increased tensile strength in this area. The added material may be a woven tape of strong warp elements or the material may be an unwoven series of wires or filaments affixed to the surface of the blade (preferably the undersurface) by sewing or cementing.

In strengthening the blade it is preferable that the finest wires or filaments available be utilized in that such filaments provide both increased strength and increased flexibility.

Referring to FIG. 5, the limits of affixing a strengthening material to the leading edge fairing are shown. In FIG. 5, a bundle or skein of filaments 124 is strung spanwise along the leading edge of the blade 100a. Filaments 124 are sewn into a leading edge fairing shape by stitching indicated at 126. The stitching 126 is repeated at stations along the span of blade 100a to secure the bundle of filaments 124 to the blade. A membranous cover 128 can be stitched or cemented to the fiber bundle to provide a smooth protective coating. A further embodiment might be employed which is essentially a combination of the embodiments of FIGS. 3 and 4. In this embodiment a bundle of filaments such as that shown in FIG. 4 is formed into the desired shape by moulding the filaments with a soft rubbery material.

It will be appreciated that the bundles or skeins shown in FIG. 5 which form part of the blade 100a must, as the blade 100 must, be attached to the tip and hub assemblies in some manner, FIGS. 6 to 9 illustrate a suitable arrangement for effecting such an attachment. Referring to FIG. 6 which generally corresponds to an enlarged view taken from underneath blade 100a in the embodiment of FIG. 5, a bundle of filaments 130 is secured to the leading edge of blade 100a in a suitable manner such as described above. The bundle 130 is formed by a single filament or wire 132 which is shown in solid lines in one course thereof along blade 100a. The filament 132 passes from its course along the leading edge of the blade 100a through a looplike thimble fitting 134 and back down the blade 100a along the opposite side of the bundle 130 to a similar fitting corresponding to thimble 134, the bundle 130 being formed by repeating this routing of filament 132. Thimble 134 preferably comprises a slit tube 136 having a longitudinal slit 136a therein as may best be seen in FIG 7. Slit 136a permits the filament courses to be wound into the thimble 134 during the forming of the bundle 130 rather than having to be threaded therethrough. A transition section 130a (see FIG. 6) exists between the separate portions of filament bundle 130 as shown in FIG. 7 and the fully faired shape shown in FIG. 5. The transition 130a may be controlled by forming a thin sleeve (not shown) over the bundle 130 in this region to control the transition although under some circumstances the transition 130a may be left free. Alternatively, the transition section 130a can be moulded in a rubbery substance (not shown) to provide control thereof.

Referring to FIGS. 8 and 9, the rotor blade embodiment of FIGS. 6 and 7 is shown as incorporated in a rotary hub arrangement adapted to provide attachment of the shaped blade 100a to the hub proper. The embodiment of FIGS. 8 and 9 is similar to that of FIG. 1 and like elements have been given the same reference numerals with primes attached. Hub 102' includes a series of upper and lower socket supports 138 and 140 which serve in mounting corresponding ball members 138a and 140a to form a ball joint. Ball members 138a and 140a include respective circumferential grooves 138b and 140b therein adapted to receive looplike thimbles 138c and 140c, respectively, thimbles 138c and 140c corresponding to thimble 134 of FIGS. 6 and 7. It will of course be appreciated that the arrangement including ball member 138a and thimble 138c is used to attach flat pack 122' to hub 102' in that same manner as leading edge fairing 114' is attached thereto. Hub 102' further includes a series of slots 142 which permit some flexibility of movement of blades 100' in order that blades 100' may be wrapped around hub 102' as shown in FIG. 9 to provide stowage thereof.

As is generally indicated in FIG. 15 described hereinbelow, the blade angle, that is the angle between the chord and the plane of rotation varies along the radius of the blade. Generally, at the outboard end of the blade, the blade angle between the blade or airfoil section and the plane of rotation is usually on the order of, for example, 5° or 10° and increases toward the root. At the inboard or root end of the blade the angle between the plane of the blade and the plane of rotation should be much greater, this angle approaching 90° for very large radius blades mounted on very small radius hubs. In instances where the ratio of the radius of the hub to the radius of the tip is larger, the desired blade angle at the hub may be more moderate, for example, on the order of 20° or 30°. Where the blade angle at the hub is relatively small, difficulty will be encountered in wrapping the blade about the hub without kinking unless either:

1. A substantial amount of the leading edge span (amounting to perhaps more than 80 percent of the root chord for a root blade angle of 30°) is slid back into the interior of the hub as described hereinabove, or
2. The winding be along a helix with a large helix angle (substantially the complement of the root blade angle). This alternative requires a relatively long hub.

Where these alternatives are not appropriate the blade can be mounted on the pivoted root boom arrangement shown in FIGS. 10 and 11.

Referring to FIGS. 10 and 11, there is shown a root boom member 344 positioned outwardly of a rotatable hub or spool 346 which generally corresponds to hub 102 of FIG. 1. Hub 346 is generally cylindrical and as is best seen in FIG. 11 boom 344 is formed out of the thickness of the wall of hub 346 such that the outer curved surface of boom 344 completes the curvature of hub 346 in that region. A sail rotor blade S is attached to boom 344 along the length thereof. A bevel gear or pinion 348 is affixed to boom 344 by a suitable connecting shaft 350 which extends through an opening 352 in spool 346, shaft 350 being journaled for rotation in opening 352. The other root booms in these systems are similarly affixed to corresponding level pinions, boom 344' being shown affixed to pinion 350' in FIG. 11. Pinion 348 (together with pinion 350') engages a circular gear track or ring 354 best seen in FIG. 11. Gear track 354 is mounted for rotation with respect to spool 346 by a suitable bearing arrangement (not shown). A stop member 356 extending downwardly of track 354 into the closed space defined thereby is adapted to contact a corresponding stop member 358 which extends outwardly of the inner wall of spool 346. In operation, a twisting moment experienced by the tip of one of the blades will be transmitted to the root of the blades and to the corresponding root boom to cause pivoting of the boom such that the boom will tend to position itself at a smaller angle with respect to the plane of rotation of the blades (perpendicular to the axis of rotation of spool 346). Considering boom 344, movement of boom 344 under these conditions from the position shown in solid lines in FIG. 10 to the positions shown in dashed lines will cause rotation of shaft 350 and of pinion 348 thereby resulting in rotation of gear ring 354 with respect to spool 346. Rotation of gear ring 354 will ensure that bevel gear 348' is rotated an amount equal to the amount of rotation of bevel gear 348 and thus that the positions of root booms 344 and 344' will be made coordinate. The stops 356 and 358 cooperate to limit the pivoting of root booms 344 and 344' to acceptable values.

It would be appreciated that boom 344 may be pivoted to the upright position shown in solid lines in FIG. 10 when it is desired to wrap the blade S about hub 346 to provide stowage thereof. With boom 344 aligned with the longitudinal axis of hub 346, blade S may be wrapped uniformly around hub 346 without kinking of the blade becoming a problem.

Sail S is attached to boom 344 by a rope 360 sewn along the inboard chord thereof. Rope 360 is captured in an interior recess in boom 344 which faces the flat surface of hub 346 and which opens into a narrow slot 362, slot 362 and rope 360 cooperating in securing blade S to boom 344 as in the manner described hereinabove in connection with FIGS. 1 and 2.

It is noted that in an alternative embodiment the stops 356, 358 may be eliminated and the rotation of ring gear 354 controlled by a drive motor (not shown). In this way, the blade angle settings of the blades may be controlled together, this arrangement thus providing collective pitch control.

Referring again to FIG. 1 and more particularly to rotor tip weight 104, the need for a rotor tip weight is of course obvious and well known in the art. Such tip weights have a strong tendency to fly with the longitudinal axis of inertia thereof (or axis of minimum moment of inertia) in a plane perpendicular to the axis of rotation of the blades. This tendency can be used to control the blade angle distribution along the blades 100 and consequently the load distribution thereon. It should be noted as is explained hereinbelow that the stabilizing tendency provided by the flight of the longitudinal axis of the tip weight in a plane perpendicular to the axis of rotation depends on the nonsymmetric nature of the tip weight.

Figure 12:
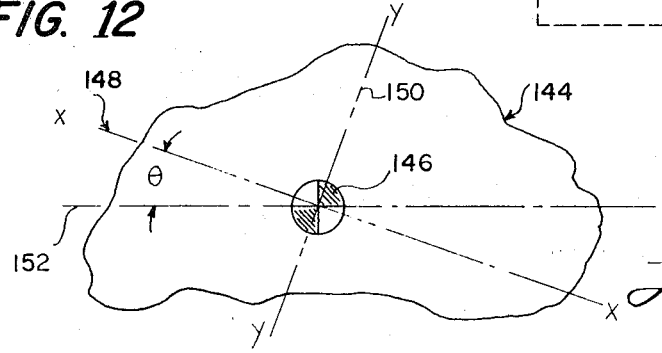
FIGS. 12 and 13 are explanatory diagrams, FIG. 13 illustrating a preferred tip mass shape.
Figure 13:
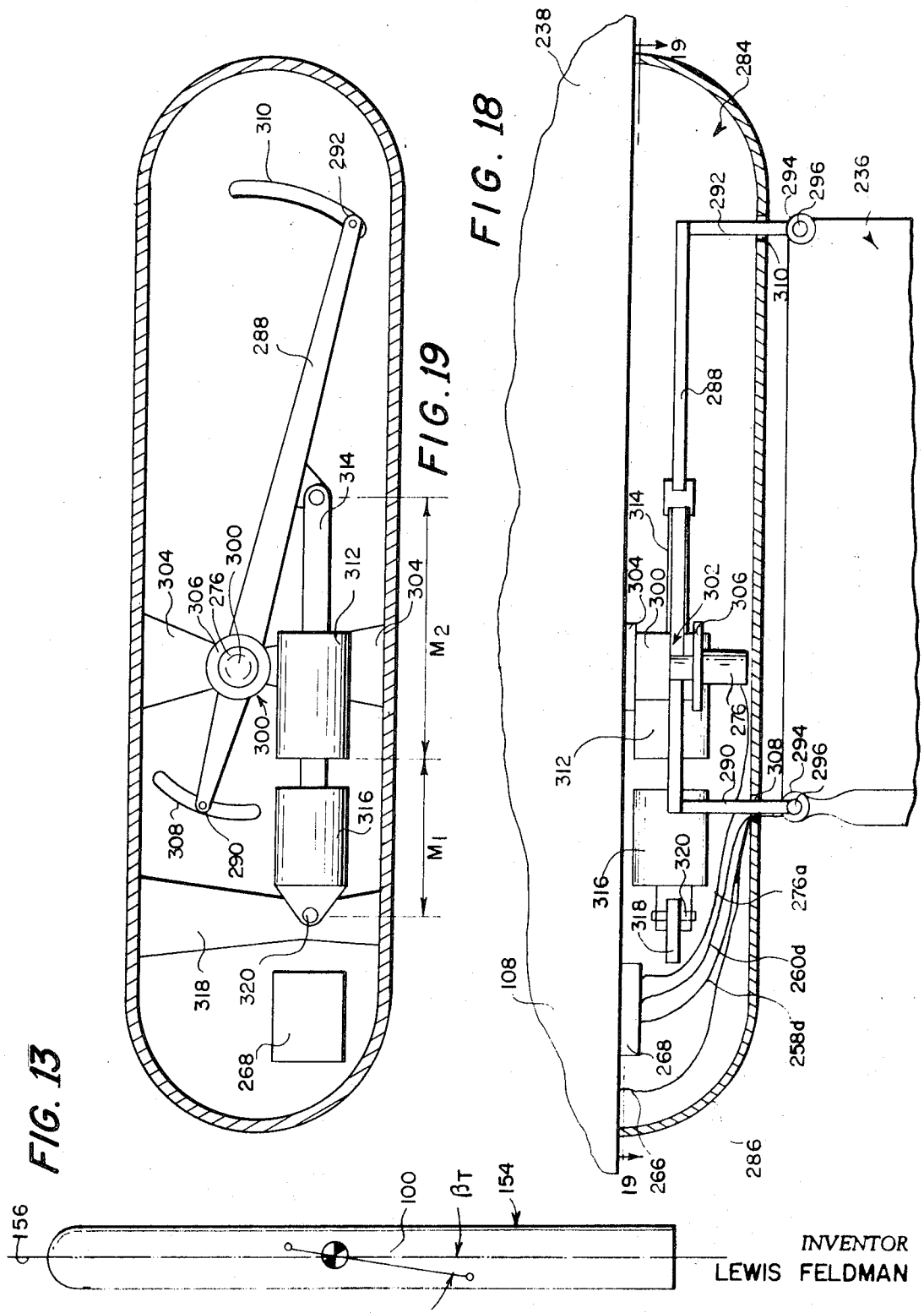

Referring to FIG. 12 a generalized tip body or mass 144 is viewed down a radial line extending from the center of rotation of the rotor. Mass 144 may be thought of as rotating about an axis of rotation generally parallel to the longitudinal axis of the paper and in a plane perpendicular to that axis and thus the radial line extends perpendicularly to the plane of the paper. The center of mass is indicated at 146 and the two principal axes of inertia shown (a third axis is located along a line perpendicular to the plane of the drawing). As illustrated the distribution of mass is greater along the X—X axis than along the Y—Y axis. As tip body 144 rotates about a center of rotation as described hereinabove the body will experience a moment due to the rotation thereof which tends to drive the X—X axis toward a plane perpendicular to the axis of rotation denoted 152 in FIG. 12. Stated differently, this moment will tend to drive the angle $\theta$ indicated between axes 148 and 152 to zero. This moment will be proportional to the difference between the moment of inertia about the Y—Y axis and the moment of inertia about the X—X axis. Hence, it is noted that if the tip mass 144 were symmetric with respect to the axis perpendicular to the X—X and Y—Y axis as, for example where the tip mass is formed as a circular disc or as a sphere, the moments of inertia about the two axes would be the same and the stabilizing force produced would disappear. In order to maximize this stabilizing moment produced the tip should be made long and thin as indicated in FIG. 13 (as well as in FIG. 1) so as to produce a large difference between the two moments of inertia. Referring to FIG. 13, a long, thin tip weight 154 is shown flying with the longitudinal axis thereof (denoted 156) perpendicular to the axis of rotation of the blade which is parallel to the longitudinal axis of the paper. The end of blade 100 is attached to tip body 154 at an angle indicated at $\beta_t$. In FIG. 13 the blade is assumed to be rotating such that the tip weight 154 is moving from right to left along axis 156 and under these circumstances the regions of the blade near the tip thereof will experience a positive (upward) lift. If the blade end is attached to the tip weight such that the angle $\beta_t$ was negative ($\beta_t$ being the angle between the blade 100 and axis 156) the lift experienced by the outer regions of the blade 100 is negative. Further, where the angle $\beta_t$ is equal to zero the blade load is very small in the region of the blade tip. For good performance and stability it is necessary that the load be properly distributed in the outermost regions of the blade 100.

The blade angle can also be controlled by the use of a fin or elevator 104a shown in FIG. 1. If the elevator is located aft of the blade in a position beneficial to stability (as shown in FIG. 1) in order to produce a positive load on the blade the elevator 104a must itself contribute a negative load, that is, a downward force. The net lift provided is the difference between the positive lift provided by the tip weight flying as illustrated in FIG. 11 and the negative lift provided by the elevator 104a although the additional cost in the drag due to the load on the elevator must also be borne. It is noted that if the elevator 104a is placed forward of the blade the load provided thereby will be in the proper direction but the elevator 104a will then provide a destabilizing effect and this loss in stability must be made up through other means.

Turning now to a discussion of the aeronautical vehicle of the invention and referring to FIG. 14, an aeronautical vehicle generally denoted 210 includes a windshield 212 partially broken away to show a flexible blade aeronautical device generally denoted 214 which, as stated, and for reasons which will become more apparent hereinafter, will, for sake of convenience, be referred to as a "sky-hook" or a "sky-hook vehicle." Vehicle 210 further includes a rocket interstage 216 and a booster 218, both of conventional construction. Booster rocket 218, of which only a portion is shown in FIG. 14, includes a series of fins (not shown) which impart a spin to the vehicle 210 during the flight thereof. The use of such fins to impart a given spin to a vehicle is of course well known in the art.

Windshield 212 is optional and is constructed of a number of separate sections joined together to form the completed shield, sections 212a and 212b being indicated in FIG. 14. Linear explosive charges located at the line of joinder or seam between the various sections (charge 220 being shown between sections 212a and 212b) provide means for jettisoning shield 212 at a suitable time during the travel of vehicle 210. The use of such linear charges is conventional and further description thereof is deemed unnecessary.

Sky-hook 214 which might itself in one sense be considered to be the "payload" of the rocket system including interstage 216 and booster rocket 218 includes a payload body 222 which is partially broken away in FIG. 14 to show a portion of the control system for the vehicle 214. The portion of the sky-hook 214 which mounts payload body 222 is similarly broken away to show part of this system which will be described in some detail hereinbelow. Physically, sky-hook 214 basically comprises payload body 222 which is of generally cylindrical construction and which includes a hemispherical nose as shown, a generally cylindrical intermediate section 224, and a generally cylindrical base portion 226 which is positioned atop interstage 216 as shown. Intermediate section 224 includes an outer cylindrical member or spool which is mounted to rotate with respect to an inner control-carrying portion 230 of section 224 by a suitable bearing arrangement (bearing 232 being indicated in FIG. 14). Spool 228 which is mounted concentrically with inner portion 230 is adapted to permit a number of flexible rotor members or blades 236 to be wrapped therearound in their inoperative positions to provide stowage therefor. Blades 236 are shown in the unfurled positions thereof in FIG. 15. Each of the blades 236 is secured at the inboard end thereof to spool 228 by suitable means such as those described hereinabove in connection with either FIGS. 1 and 2, FIGS. 6 and 7, and FIGS. 10 and 11 and at the outboard or tip thereof to a tip body in the form of a tip rocket 238. Although FIGS. 14 and 15 are intended to illustrate a sky-hook having two rotor blades it will be appreciated that the number of blades employed is a matter of design. Rockets 238 each include a stabilizing fin 238a located at the rear end thereof.

With blades 236 in the stowed positions thereof, that is, wrapped about spool 238, tip rocket 238 is clamped to the sky-hook 214 by an upper clamp 240 affixed to payload body 222 and a lower clamp 242 affixed to base section 226. Clamps 240 and 242 are preferably of a construction which permits release thereof, and thus of tip rockets 238, at a predetermined time during the flight of the vehicle 210 and thus may, for example, include a solenoid actuator controlled from the vehicle control system. A retractable pin 243 serves, in the operative position thereof, to prevent rotation of spool 228 with respect to the main body of sky-hook vehicle 214.

The control system for the vehicle includes a barometric altimeter 244 including a static pressure tube 246 which leads to a static orifice 248 at the surface of payload body 222. Another static pressure tube 250 connected between orifice 248 and terminating in a further orifice 252 provides sensing when shield 212 is in place. With shield 212 removed orifice 248 provides sensing for the altimeter 244. Altimeter 244 provides an altitude indication by measuring the ambient atmospheric pressure. Because of the relationship between the atmospheric pressure and altitude, a pressure reading provided by the pressure sensing system of the altimeter 244 can be directly converted into an altitude reading and thus such a reading is generally termed a "pressure altitude." The altimeter 244 may also be of a density measuring type which provides a "density altitude" indication based on the local or ambient atmospheric density sensed. It is noted that the altitude indications provided by either of these devices are aerodynamically more meaningful than a geometrical altitude indication. Altimeter 244 is connected to a timing device 245 which, among other functions described hereinbelow, controls ignition of the linear charges 220 as well as release of tip rocket clamps 240 and 242. The timing device 245 may be of conventional construction, the actual makeup of the timing device 245 being merely a matter of design given the functions it is to perform.

The altimeter 244 is mounted atop an inertial measuring unit (IMU) 254 which measures the motion of the sky-hook vehicle 214 and which provides electrical signals used in controlling and stabilizing the vehicle. Where the sky-hook vehicle 214 is permitted to drift about in space, judicious selection of the vertical location of the rotor with respect to the center of gravity of the payload will provide adequate stability. Where drifting is allowed but restriction is required on the permitted departure of the vehicle attitude, IMU 254 may merely comprise a gyro device adapted to provide indications of the attitude angles of the body with respect to the vertical in two planes, that is, indications of pitch angle and bank angle. If, however, it is desired to counter the effects of wind and to control drift, more information in the form of indications of the velocity in the pitch and bank planes is necessary. Further, for the more extreme case where it is desired that the vehicle hover over a given point, the IMU 254 must provide information not only as to the body attitude angles and the components of horizontal velocity but also as to the displacement of the vehicle from the selected setpoint. It is noted that any and all of these functions can be carried out by inertial measuring unit techniques well known in the art.

The electrical signals provided by unit 254 are fed to a computer unit 256 which converts these signals into two channels of control signals denoted $V\theta_1$ and $V\theta_2$ and $V\phi_1$ and $V\phi_2$ in FIG. 16, $\theta$ being the pitch angle and $\phi$ being the bank angle. The function of these control signals will be discussed in some detail hereinbelow but, in general, the control signals are utilized in controlling the blade angle settings of the blades 236. The output of computer 256 is connected to a series of rings 258, 260 and 262 mounted in axially spaced relationship about the outer cylindrical surface of portion 230 of intermediate section 224. Ring 258 is a "pitch" ring, that is, a ring used in controlling the pitch of the sky-hook 214 and is connected to the $V\theta_1$ and $V\theta_2$ outputs of computer 256 by means of conductors 258a and 258b (see also FIG. 16) whereas ring 260 is a "bank" or "roll" ring and is connected to the $V\phi_1$ and $V\phi_2$ outputs of computer 256 by means of conductors 260a and 260b. A further conductor 264 connected from computer 256 and between rings 258 and 260 (see FIG. 16) is grounded at 264a to intermediate section 224 of sky-hook 214. A further conductor 266 carries a thrust signal, derived by computer 256 from the altitude error signal, from computer 256 to ring 262, which is, as is explained more fully hereinbelow, a conventional slipring.

Considering FIGS. 10 and 12 together, it will be seen that a series of six inputs (FIG. 16) are provided to computer 256 from IMU 254 through a cable 261 (FIG. 14), three inputs in each of the first and second input channels. An altitude error signal input is provided from the altimeter 244. The timing device 245 also is connected to the computer 256 in the sense that timing device 245 turns the computer 256 on in order to activate the stabilization system. As discussed, the information required of IMU 254 is a function of the degree of control of sky-hook 214 desired. The input signals provided by IMU 254 as described hereinbelow along with the altitude error signal from the altimeter permit complete control of the position of the sky-hook 214. The first input channel to computer 254 provides signals related to pitch or, more specifically, signals related to the pitch angle, $\theta$, to the horizontal velocity of the vehicle in the pitch plane, $\dot{x}$, and to the displacement of the vehicle from a setpoint in the pitch plane, $x$. The second channel provides roll or bank signals; again more specifically, signals related to the bank angle, $\phi$ to the horizontal velocity in the bank plane, $\dot{Y}$, (the bank plane being a vertical plane perpendicular to the pitch plane), and to the horizontal displacement from a set point in the bank plane, $Y$. These signals (which are indicated in FIG. 16) are appropriately modified in computer 256 and combined to produce voltage signals $V\theta_1$ and $V\theta_2$ and $V\phi_1$ and $V\phi_2$ as discussed above. The computation function performed by computer 256 may, for example, involve the formation of a weighted average (where $V\theta = K_1\theta + K_2\dot{x} + K_3x$) or may entail merely amplifying the output signal of IMU 254 to a level suitable for use in the control actuators described hereinbelow. The function performed by computer 256 will, of course, be a function of the degree of control desired as well as the amount of sophistication to be built into the system and thus the computer 256 may provide suitable "compensation" in the output signals such as by introducing "leads" and "lags" in these signals. Such procedures are well known in the feedback control art and further description of the operation of the computer 256, which forms no part of the invention, is thought unnecessary. It is preferred that the voltage signals of these two channels, e.g., voltages $V\theta_1$ and $V\theta_2$, comprise a positive and negative voltage as referenced to the control system ground.

Rings 258 and 260 are nonlinear potentiometerlike resistors the voltages on or around which vary cyclically in a desired manner along the peripheries thereof. Again considering FIGS. 14 and 16 together, it will be seen that conductors 258a and 258b are connected to diametrically opposed points D and B along the periphery of ring 258 and, similarly, that conductors 260a and 260b are connected to diametrically opposed points B' and D' on the periphery of ring 260. Further, considering ring 258, ground conductor 264 is connected to first and second diametrically opposed points A and C which are rotated by 90° from points D and B respectively. Corresponding points A' and C' on the periphery of ring 260 are similarly connected to ground by means of conductor 264. The axis determined by points B and D (and B' and D'), which are connected to the output of computer 256, may be referred to as the "axis of maximum control" whereas the perpendicular axis determined by grounded points A and C (or A' and C') may be referred to as the "axis of no control." It is noted that the precise orientation of the line of no control with respect to a fore and aft reference is a matter of design.

Referring to ring 258 (although it will be appreciated that similar considerations apply to ring 260) it is noted that because of the configuration of the ring and because of the connections to points A, B, C and D on the periphery thereof the voltage along the periphery of ring 258 will be generally of the form illustrated in FIG. 17. FIG. 17 is a plot of voltage as a function of the distance around the circumference of ring 258 although it should be noted that the voltage need not vary sinusoidally between the impressed voltage in each quadrant but may be any monotonic function. Referring to FIG. 14, the voltage at points A and C corresponds to the ground voltage whereas the voltage at point D corresponds to the positive voltage $V\theta_1$ and the voltage at point B corresponds to the negative voltage $V\theta_2$ and thus as shown the voltage about ring 258 varies between a maximum at point D and a minimum at point B and passes through zero at points A and C. It will be appreciated that a similar voltage plot characterizes the voltage about the periphery of ring 260. Where the combination of outputs produced by IMU 254 indicated that no blade angle variation is necessary to achieve the proper pitch, the voltages $V\theta_1$ and $V\theta_2$ will both be zero, i.e., at the same level as ground. Under these circumstances the voltages at points A, B, C and D will be the same, i.e., ground voltage, and hence the voltage around the entire periphery of ring 258 will also be at ground voltage.

Referring again to FIG. 14, first and second brushes 258c and 260c mounted on rotatable spool 228 are provided to tap off the voltages from rings 258 and 260, respectively. A third brush 262a also mounted on spool 228 provides a voltage tap for ring 262. It will be appreciated that because the voltage around the circumference or periphery of rings 258 and 260 varies as discussed above the actual voltage presented at brushes 258c and 260c will be a function of the angular position of spool 228 and hence that a cyclic voltage variation is provided as spool 228 rotates about intermediate section 224.

Control rings 258 and 260 provide voltages used in controlling the blade angle setting of each of the blades 236. Each blade 236 includes a set of brushes corresponding to brushes 258c, 260c and as explained hereinbefore the angular position of each of the blades 236 will determine the voltage value present at the associated brushes. Thus the lower portion of FIG. 16 actually represents only the output processing arrangement for a single set of brushes and the arrangement shown for brushes 258c and 260c would be repeated for such blade. In general, the brushes for the various blades are equally spaced about the circumference of the control rings 258, 260. Brushes 258c and 260c are connected through conductors 258d and 260d to the input of adder device 268a. Adder device 268 adds the voltage output at brush 258c to that at brush 260c and includes input resistors 270, 272 and 278, operational amplifier 274 and feedback resistor 280. Conductors 258d and 260d are connected through resistors 270 and 272 to the input of operational amplifier 274. Feedback resistor 280 is connected in a feedback path between the output and input of operational amplifier 274. A third input voltage $V\Omega$, provided by a radial accelerometer and signal processor 276, is also added to these two voltages and is connected to amplifier 274 through resistor 278 via conductor 276c. A unit corresponding to radial accelerometer and signal processing unit 276 is located in a control pod located on each tip rocket 238. In general, as is described below, these units provide a signal used in blade angle control. The makeup and function of the control pod will be discussed in some detail hereinbelow. It will be understood that adder 268 can take other forms and that the forms shown in FIG. 16 is merely exemplary. Adder 268 sums the voltage inputs provided by brushes 258c and 260c and by the accelerometer-processor unit 276 to produce an output voltage at output 282 used in controlling the blade angle setting of the corresponding rotor blade 236. This output voltage is denoted $V\beta$ in FIG. 14.

The blade angle setting of each of the rotor blades 236 is controlled by an individual control pod arrangement best shown in FIGS. 18 and 19. Each control pod, denoted 284, is mounted on the outer surface of a corresponding tip body 238 as may best be seen in FIG. 18 (a portion of control pod 284 also being shown in FIG. 9). Control pod 284 includes an outer envelope or shell 286 which is secured to the outer surface of tip body 238 and which houses a control mechanism including a pivotable tip boom 288. Rotor blade 236 is secured to opposite ends of tip boom 288 through first and second extension members 290 and 292 pinned to blade grommets 294 by bolts or clevis pins 296, the tip chord of blade 236 lying generally parallel to the longitudinal axis of boom 288. The leading edge of blade 236 has located therein a series of conductors 258d, 260d and 276a described above which are adapted to carry the control signals $V\theta$, $V\phi$ and $V\Omega$ shown in FIG. 16 to the control pod 284. These signals are transmitted to adder 268 as described hereinabove, adder 268 being located in control pod 284 as shown. The tip boom 288 is pivotably mounted by means of a pivot stud or shaft 300 about which boom 288 can rotate. A bearing surface denoted 302 is provided between shaft 300 and boom 288. Shaft 300 is fixed to the shell housing 286 by means of a strut 304 which extends between opposite walls of housing 286. A thrust bearing 306 mounted on shaft 300 transmits the centrifugal force on the tip body to boom 288 and consequently to blade 236. Accelerometer 276 described hereinbefore is mounted outwardly of thrust bearing 306 and as shown is connected to adder 268 through conductor 276a. Arcuate slots 308 and 310 located in one wall of envelope 286 permit the connection of boom 288 to the blade 236 as well as limit the angular pivoting movement of the boom 288.

An actuator 312 controls the pivoting movement of boom 288 by control of the movement of a crank arm 314. A damper device 316 provides damping of movement of the tip boom 288 with respect to pod 284. A supporting strut 318 serves to anchor the damper-actuator assembly to the pod 284. The assembly may be affixed to strut 318 by suitable means indicated at 320. Damper 316 is of conventional form and may include a centering spring or springs such that when the damper is at rest, i.e., not moving, the distance $M_1$ indicated in the drawing is a fixed design value. It is noted that damper 316 may be omitted under some circumstances. Actuator 312 is also of conventional form and may be an electric, hydraulic, or, when possible, a ram air-operated pneumatic unit. The distance $M_2$ (and hence the distance $M_1$ plus $M_2$) is regulated by actuator 312 to vary the angular positioning of boom 288 and thus the blade angle setting of blade 236 with respect to tip rocket 238. The tip rocket 238 will tend to fly in a plane perpendicular to the axis of rotation of the blade 236 and thus by controlling the angle between the longitudinal axis of the pod 284 and the longitudinal axis of the boom 288 and blade angle setting can be controlled.

Referring to FIG. 20, a sectional view of tip rocket 238 illustrates the internal construction thereof. Rocket 238 is a liquid-fueled rocket motor driven by pressurized gas. As shown, rocket 238 includes a sphere 322 which includes a pressurizing gas such as helium or nitrogen. The pressurizing gas is transmitted through an oxidizer pressurization line 324 to an oxidizer tank 326 and through a fuel pressurizing line (not shown but located on the opposite side of rocket 238 from line 324) to a fuel tank 328. Tanks 326 and 328 are, as shown, actually part of a single tank 330 which is divided into two sections by a partitioning member 332. Tank 330 is bulged out in the radial direction and a fuel line 334 and an oxidizer line 336 are connected to this bulge on opposite sides of partitioning member 332 so that when the liquid contents of tanks 326 and 328 are slung out by centrifugal force during the rotation of the blades 236 the inlets to lines 334 and 336 will be covered until the tanks 326, 328 are empty. Fuel line 334 and oxidizer line 336 are connected to a combustion chamber 338 which is in turn connected to rocket thrust nozzle 340. The thrust of rocket 238 is controlled by a pressure regulator 342 located at the output of pressurizing sphere 322. Electrical conductor 266 shown in FIGS. 10 and 14 connected from the control system located in the sky-hook 214 transmits a thrust control signal to regulator 342. Except as noted rocket 238 is of conventional construction and further discussion thereof is deemed unnecessary.

The operation of the embodiments of FIGS. 10 to 16 can perhaps be best understood from briefly considering the launching and deploying steps in chronological sequence.

By way of example, it will be assumed that the vehicle 210 is to be rocket launched (by means of the rocket 218) in a vertical direction, although other launching means and other trajectories may, of course, be utilized. Launching of booster rocket 218 causes upward acceleration of vehicle 210 which, after burn out, continues to climb upward to the apogee of the flight path. As stated, during flight, a spin is imparted to vehicle 210 by fins (not shown) located on rocket 218. When altimeter 244 indicates that vehicle 210 is approaching its apogee, the deployment sequence begins.

First, altimeter 244 will produce a signal at a predetermined position in the flight of vehicle 210, which signal is transmitted to timer device 245 which controls setting off of linear charges 220. Charges 220 will cut the windshield 212 into segments (such as portions 212a and 212b shown in FIG. 10), which sections will, because of the rotation of vehicle 210, be carried away from the main body of the vehicle by their inertia.

After the windshield 212 is removed the timer 245 produces a signal which causes release of clamps 240, 242 (see FIG. 14) thus permitting tip rockets 238 to fly radially outward. The "-slinging" out of individual tip rockets 238 is enhanced by the energy and momentum supplied by the spinning of sky-hook body 214 through corresponding blades 236. After the release of clamps 240, 242 the tip rockets 238 will continue to fly outwardly and will pitch down toward the plane of rotation of blades 236. The outward motion of tip rocket 238 will cause the associated blades 236 to completely unfurl from spool 238 and to assume the fully deployed positions thereof as shown in FIG. 15. The centrifugal forces on tip rockets 238 will tension blades 236 during rotation thereof as explained hereinabove.

The spent booster 218 may be jettisoned in a conventional manner when the desired amount of angular momentum has been supplied to the blade and tip rocket assemblies. Similarly, retractable pin 243 may be released when sky-hook 214 has decelerated to a desired rate of rotation, release of pin 243 permitting free rotation of spool 228 with respect to the main body portion of sky-hook 214. Release of pin 243 may be conveniently controlled by means of the timer device referred to above. The timer may also be used in controlling the drive system for tip rockets 238 after the rockets have moved a safe radial distance from the main body portion of sky-hook 214. The control system of FIG. 16 described hereinabove may also be "engaged" or activated after the release of pin 243.

A number of basic operations of functions are controlled by the control system during the flight of sky-hook 214 and although certain of these operations have been described to some extent hereinabove these operations will be discussed hereinbelow briefly in considering the overall operation of the sky-hook 214.

The altitude of sky-hook vehicle 214 is controlled by the thrust setting of tip rocket 238 (an increase in the thrust of tip rockets 238 resulting in an increase in the altitude of the sky-hook 214), the actual altitude of the sky-hook 214 being sensed by altimeter 244. As stated, although other altimeters such as those employing radar or inertial control may be utilized, because the sky-hook 214 is essentially an aerodynamic device the use of a conventional barometric altimeter is preferred. For special applications a barometric altimeter having an output which is temperature corrected to density altitude is preferred. The output of altimeter 244 is "conditioned" within computer 256 and applied to conventional slipring 262. The output of ring 262 which in contrast to rings 258 and 260 is constant irrespective of the angular position of brush 262a is transmitted through conductor 266 (located along with conductors 258d and 260d in the leading edge of blade 236) through control pod 284 to pressure regulator 342 of tip rocket 234.

The rotational speed of rotor blades 236 is controlled by controlling the average blade angle setting of the blades. This setting will be decreased or increased as required through controlling the actual centrifugal acceleration detected by radial accelerometer 276 located in control pod 284 with a reference acceleration corresponding to the required speed, the acceleration being, of course, proportional to the square of the speed of the rotor blades 236. As described hereinbefore the output of the radial accelerometer and signal processor 276 is a voltage $V\Omega$ which is added to the voltages at brushes 258c and 260c in adder 268.

The stabilization and station-keeping functions which are interrelated with the rotor blade speed are controlled through inertial measuring unit 254 as described above. Unit 254 measures the motion of sky-hook 214 and provides two channels of electrical signals which characterize this motion and which are transmitted to computer device 256. As discussed hereinabove the nature of the inputs provided by IMU 254 depends upon the degree or completeness of control of sky-hook 214 desired. Computer 256 converts these inputs into first and second pairs of voltages ($V\theta_1$, $V\theta_2$ and $V\phi_1$, $V\phi_2$) which are respectively supplied to pitch control ring 258 and roll control ring 260. Rings 258 and 260 provide cyclic voltage transfer, the voltage produced at corresponding brushes 258c and 260c being dependent upon the angular position of these brushes with respect to the associated rings. Brushes corresponding to brushes 258c and 260c are provided for each blade 236 and are connected through conductors (258d and 260d) mounted in the leading edge of the corresponding blade 236 to an adder (268) mounted in a corresponding control pod 284. As stated, the output $V\Omega$ of radial accelerometer and signal processing unit 276 is added to the pitch and roll signals in adder 268 and the resultant output voltage $V\beta$ is used to control the blade angle setting through control of actuator 112. Thus the blade angle setting is a function of the desired speed of the rotor blades 236 as well as of the desired positioning of the sky-hook 214, these quantities being interrelated.

Referring to FIGS. 21 to 24 there is shown a rigid blade embodiment of the sky-hook of the invention in contrast to the flexible blade embodiments described hereinabove. The overall construction of the vehicle is similar to that of vehicle 210 of FIG. 14 and like elements have been given the same numbers with primes attached. Referring to FIG. 21 an aerodynamic vehicle 210' carries a sky-hook vehicle 214' mounted above interstage 216'. Sky-hook vehicle 214' basically comprises a pay load section 400 located at the aft end thereof, an intermediate gas generator section 402, and a rotary hub section 404 located at the forward end thereof. It should be noted that the sky-hook construction shown in FIG. 21 is merely exemplary and that, for example, in some instances the stability characteristics may be improved where the center of gravity of the vehicle is located above the rotor section 402. Moreover, it will be advantageous in some sky-hook systems to locate the pay section 400 above the rotor section 402.

The construction of hub section 404, can be understood from considering FIG. 21 together with FIGS. 22 and 23. Section 404 includes a rotary hub 406 which mounts first and second rigid blades 408 and 410. Hub 406 includes first and second oppositely disposed flange members 412 and 414 which cooperate with corresponding flange pairs 416 and 418 formed on blades 408 and 410 to form hinges for the blades 408 and 410, respectively, flange pairs 416 and 418 providing pivoting of the blades 408 and 410 about the axes formed by first and second connecting pins 420 and 422 which extend through flanges 412 and 414, respectively, between the spaced flanges forming the flange pairs 416 and 418. Blades 408 and 410 in the inoperative positions thereof are stowed along the sides of vehicle 214' generally parallel to the longitudinal axis thereof (as shown in FIG. 21) whereas in the operative positions thereof, blades 408 and 410 lie in a plane perpendicular to that axis (see FIG. 24). A detent mechanism (not shown) may be utilized to lock the blades in the erected or operative positions thereof, although the blades may also be permitted to flap free. Blades 408 and 410 may be deployed by centrifugal force or by being jacked into position by a suitable actuator (not shown).

The rigid rotor blades 408 and 410 are driven by compressed gas supplied from gas generator 402. Although shown in FIG. 21 as being of the rocket type, generator 402 could, for example, also be of the air-breathing type. Compressed gas from generator 402 is supplied through a ducting arrangement which includes a main duct 424 formed by the cylindrical portion of vehicle 214' which joins generator section 402 to rotor 406. An interlocking flange arrangement denoted 426 aids in sealing the connection between cylindrical duct 424 and rotary hub 406 to prevent loss of pressure. Duct 424 communicates with smaller ducts 428 and 430 located in flange members 412 and 414, respectively. As may best be seen in FIG. 22, duct 430 opens into first and second branches 430a and 430b located within pin 422 which communicate with corresponding ducts 432a and 432b located in the flanges forming flange pair 418. A similar ducting arrangement provides passage of gas from flange 412 to flange pair 416. Further ducting (not shown) provides a connecting path to thrust nozzles 434 and 436 located in the outboard or tip ends of blades 408 and 410, respectively (see FIG. 24). Jets of gas released through thrust nozzles 434 and 436 provide reaction propulsion forces which cause rotation of the blades 408 and 410.

A flexible bellowslike section 438 located between duct 424 and gas generator 402 permits tilting of rotor hub 406 with respect to the remainder of the sky-hook body. Tilting is controlled by four actuators 440 spaced at 90° intervals about the periphery of the sky-hook body. Actuators 440 each include first and second adjustable arms 440a and 440b connected to the gas generator section 402 and to the main duct 424, respectively. By varying the lengths of the arms 440a and/or 440b tilting of the rotor assembly can be controlled. Control of the plane of rotation of blades 408 and 410 provides control of the flight of the vehicle 214' as discussed hereinabove.

As described hereinabove it is often desirable to drive a rotor blade (sail rotor or otherwise) by means of a propulsion device such as a rocket mounted at the tip of the blade. If the propulsion device is of the rotating type, that is, includes a rotor member spinning about a first axis while this axis is itself rotating about the main rotor axis, then problems will arise out of the gyroscopic moments created due to the presence of both of these rotational motions. For a rotary device rotating about axis 152 of FIG. 12 the gyroscopic moment produced will manifest itself as a pitching moment which will tend to twist the blade about the Y—Y axis (compare FIG. 13).

This problem can be solved by reducing the annular momentum of the tip body to useful dimensions. It is noted that it is not always necessary or even desirable to eliminate the pitching moment opposed on the blade by the tip body and in fact for devices employing sail-type rotors as described hereinabove it is in fact highly desirable to impose a pitching moment on the blade of the proper magnitude and sign in order to ensure that the outer reaches of the blade are made to carry their appropriate loads. Once the desired level of pitching moment contribution is determined the angular momentum corresponding thereto may be obtained in a number of ways. For example, an inertia wheel or flywheel may be geared to the engine shaft and the moments of inertia of the gears and the flywheel proportioned such that the sum of the angular moments of all of the components rotating in a first direction taken with a first sign and the sum of the angular moments of all of the components rotating in a second direction taken with a second, opposite sign yield the required amount and direction of angular momentum. Such an inertia wheel arrangement can be utilized with an electric motor drive, a turbojet device, a turboprop arrangement, steam turbines, internal combustion engines and the like. In a jet engine arrangement the high-pressure spool and low-pressure spool may be driven in opposite directions and through suitable gearing and the introduction of a control motor on an idler shaft the net angular momentum can be adjusted. A similar effect in other systems can be produced by employing two separate motors driving in opposite directions. It will be appreciated that the arrangements described are exemplary of but not exhaustive of possibilities for controlling the angular momentum.

The sky-hook of the present invention may be used in meteorological observation and the like, with suitable instruments being mounted in the body portion thereof, or as part of a defense system for observing the presence or absence of enemy aircraft of various kinds. Such sky-hook vehicles can operate at altitudes of 150,000 feet and above and for this reason are markedly advantageous as compared with similar prior art devices which are unable to operate at such altitudes. In use, the sky-hook vehicle can, for example, serve as an observer craft for determining the presence or absence of an enemy after an early warning alert has been given, the vehicle, because of the altitudes at which operation thereof is possible, being able to utilize relatively short wave detectors for determining the size and shape of approaching objects. The vehicle-mounted detector could, for example, utilize light waves or the like for performing the detecting function. The fact that blades of extremely large radius may be utilized without paying a penalty in proportionally increased weight load further adds to the general attractiveness of the vehicle for use in these various areas.

Although the invention has been described in detail with reference to preferred embodiments thereof, it will be understood that variations and modifications can be effected within the scope and spirit of the invention as described hereinabove and as defined in the appended claims.

I claim:

1. An aeronautical device comprising a self-sustaining station-keeping vehicle comprising a body portion including a payload, at least one coilable rotor blade affixed at the inboard end thereof to said body portion, said at least one rotor blade being movable between a stowed position and a deployed position in which rotation of said rotor blade serves to maintain said station-keeping vehicle in flight, a mass affixed to the outboard end of said at least one coilable rotor blade, clamp means for holding said blade and said mass in the stowed position, said mass, when released serving in effecting unfurling of said rotor blade and in tensioning said rotor blade in the extended position thereof; means for controlling the release of said blade and said mass, means for imparting a rotative motion to said station-keeping vehicle for aiding in deploying said at least one rotor member when said mass is released and means adapted to be jettisoned from said station-keeping vehicle for launching said vehicle, said mass comprising self-powered means for propelling said mass and for consequently providing rotation of said blade and said device further comprising means for selectively controlling said self-powered means.

2. A device as claimed in claim 1 wherein said means for effecting deployment of said at least one rotor blade comprises means responsive to the altitude of said vehicle.

3. A device as claimed in claim 1 wherein said tip mass is elongate and includes means for controlling the angle of the plane of the rotor blade with respect to the longitudinal axis of the mass when said blade is deployed.

4. A device as claimed in claim 1 wherein said self-powered means comprises a rocket, said rocket comprising a chamber containing fuel and a chamber containing an oxidizer, means for controlling the pressure in said fuel and oxidizer chambers, a combustion chamber, and connecting means for connecting said fuel and oxidizer chambers to said combustion chamber, said fuel and oxidizer chambers being asymmetrical in cross section and bulged out in a radial direction and said connecting means being connected to said fuel and oxidizer chambers at a position where said chambers bulge out radially such that fuel and oxidizer flung out radially within the respective chambers by centrifugal force during rotation of said rocket will cover the inlet to the connecting means to the combustion chamber.

5. A device as claimed in claim 1 further comprising means for controlling the pitch of said vehicle and means for controlling the roll of said vehicle.

6. A device as claimed in claim 5 wherein said pitch control means includes means for producing electrical control signal corresponding to a desired pitch angle for controlling the blade angle of said at least one rotor blade in accordance with the angular position of said at least one blade.

7. A device as claimed in claim 6 wherein said pitch control means further includes means for providing a control voltage corresponding to the difference between the actual pitch and the desired pitch and said control signal producing means comprises a resistance element and a movable contact wiper therefor, the voltage on said resistance element varying between positive and negative voltage values, wherein such a voltage exists, such that the output of voltage at said wiper corresponds to the position of said wiper with respect to said resistance element, the position of said wiper being directly related to the angular position of said at least one rotor blade.

8. A device as claimed in claim 7 wherein said resistance is generally cylindrical in shape and includes first and second diametrically opposed positions along the periphery thereof which correspond to a ground voltage output and third and fourth diametrically opposed positions along the periphery of said resistance element, said third and fourth positions being shifted by 90° from said first and second positions, and providing, respectively, a positive and a negative output voltage, said wiper being located on a member which rotates with said rotor blade and said cylindrical resistance element being generally concentric with said member.

9. A device as claimed in claim 6 wherein said roll control means includes means for producing an electrical control signal corresponding to a desired roll angle for controlling the blade angle of said at least one rotor blade in accordance with the angular position of said rotor blade, said pitch angle control signal and said roll angle control signal being added to produce a resultant blade angle control signal.

10. A device as claimed in claim 9 further comprising means for producing a signal corresponding to a desired rotor speed, said rotor speed control being added to said pitch angle control signal and said roll angle control signal to produce a resultant blade angle control signal.

11. A device as claimed in claim 1 wherein said tip mass includes rocket means for propelling said mass, said vehicle further comprising means for controlling the altitude of said vehicle including an altimeter for determining the actual altitude of said vehicle and means for producing an electrical signal related to a comparison of actual and desired vehicle altitude and for controlling the thrust produced by said rocket means in accordance with said electrical signal.

12. A device as claimed in claim 1 wherein said body portion includes a first portion, a rotary portion and means for mounting said rotary portion for rotation with respect to said first portion, said at least one blade member being attached to said rotary portion.

13. A device as claimed in claim 12 wherein said rotary portion comprises a spool member concentric with and surrounding said body portion, said vehicle further including means for locking said spool member against rotation with respect to said first portion.

14. A device as claimed in claim 12 wherein said at least one rotor blade is wrapped around said rotary portion in the stowed position thereof.

15. A device as claimed in claim 1 wherein said mass is of elongate shape and, the longitudinal axis of said mass lying in a plane generally parallel to a plane perpendicular to the plane of the chord of said at least one rotor blade during the flight of said vehicle.

16. A device as claimed in claim 15 wherein said mass includes a stabilizing fin located rearwardly of the rearmost point at which the mass is affixed to said at least one blade.

17. A device as claimed in claim 1 wherein said blade is formed by a woven fabric and includes strengthening members woven therein, the leading edge of said blade being greater in cross section than the trailing edge thereof.

18. A device as claimed in claim 1 wherein said body portion includes means for observing conditions in the area in which the vehicle is positioned.

19. A device as claimed in claim 1 further comprising means for controlling the angle between the outboard end of said at least one rotor blade and a plane perpendicular to the axis of rotation of said blade, said angle controlling means comprising pivotable means for varying the angle between the longitudinal axis of said tip mass and the plane of the tip of said blade.

20. A device as claimed in claim 19 wherein said angle controlling means comprises a pivotable tip boom, means forming a portion of said tip mass for housing said boom and means defining first and second slots in said housing means to permit connection of said boom to said at least one blade.

21. A device as claimed in claim 1 wherein said body portion includes a rotary hub, said hub including a pivotable portion, to which is affixed said at least one flexible rotor blade, for permitting pivoting of the plane of the inboard end of said at least one blade with respect to the longitudinal axis of the hub and for permitting aligning the plane of the inboard end of the blade with longitudinal axis of the hub whereby stowage of said blade may be effected.

22. A device as claimed in claim 1 wherein said rotor blade is formed of a woven fabric and includes means for strengthening the blade comprising elements woven into said fabric.

23. A device as claimed in claim 22 wherein the strengthening means are distributed within the fabric such as to provide shaping of the leading edge of the fabric.

24. A device as claimed in claim 23 wherein said strengthening means comprises filaments distributed chordwise throughout the blade fabric, the gauge of the filaments on the leading edge of the blade being substantially greater than that of the filaments in the trailing edge of the blade such as to provide improvement in the aerodynamic characteristics of the blade.

25. A device as claimed in claim 24 wherein the gauge of the woven material forming the leading edge of the blade is greater than the gauge of the woven material forming the trailing edge of the blade.

26. A device as claimed in claim 1 wherein said rotor blade comprises a flat strip of flexible material and includes means for improving the aerodynamic characteristics of the rotor blade comprising a flexible member secured to the surface of said flat strip of material and shaped to provide a relatively blunt leading edge for said blade.

27. A device as claimed in claim 26 wherein said flexible member comprises a resilient moulding.

28. A device as claimed in claim 26 wherein said blade material comprises a flexible fabric and said flexible member comprises a bundle of filaments sewn thereto, said filaments comprising metallic filaments.

29. A device as claimed in claim 26 wherein said blade material comprises a flexible fabric and said flexible member comprises a plurality of metallic filaments in a flexible mounting, said filaments being moulded into a predetermined shape and being moulded into said fabric.

30. A device as claimed in claim 26 further comprising a first means for connecting said blade to a supporting member at the inboard end thereof and a second means for connecting said blade to said tip mass, said flexible member comprising a bundle of filaments formed by a single filament which is passed back and forth between said first connecting means and said second connecting means.

31. A device as claimed in claim 30 wherein at least one of said connecting means comprises a slit, U-shaped tube.

32. A device as claimed in claim 31 wherein said first means comprises a loop member and the supporting member comprises a ball member having a circumferential groove therein for receiving said loop.

33. A device as claimed in claim 26 wherein said blade includes securing means affixed to the inboard end of said blade along the chord thereof, a hub for supporting said blade and including a slot therein, said securing means being located within said hub and the thickness of said securing means being greater than the width of said slot.

* * * * *